United States Patent [19]

Heydner et al.

[11] Patent Number: 4,947,010
[45] Date of Patent: Aug. 7, 1990

[54] ELECTRICAL EQUIPMENT HOUSING

[75] Inventors: Konrad Heydner; Oswald Onderka, both of Altdorf, Fed. Rep. of Germany

[73] Assignee: Ellenberger & Poensgen GmbH, Altdorf, Fed. Rep. of Germany

[21] Appl. No.: 314,805

[22] Filed: Feb. 24, 1989

[30] Foreign Application Priority Data

Feb. 25, 1988 [DE] Fed. Rep. of Germany ... 8802459[U]

[51] Int. Cl.⁵ .............................................. H01H 9/02
[52] U.S. Cl. ..................................... 200/296; 439/557
[58] Field of Search ................ 200/296, 295; 439/552, 439/554–558; 248/27.3

[56] References Cited

U.S. PATENT DOCUMENTS

| 4,329,669 | 5/1982 | Krasser et al. | 335/20 |
| 4,461,938 | 7/1984 | Sorenson | 200/296 |
| 4,587,391 | 5/1986 | Harper | 200/296 |
| 4,681,386 | 7/1987 | Boulanger | 439/557 |

FOREIGN PATENT DOCUMENTS

| 2928277 | 12/1983 | Fed. Rep. of Germany . | |
| 1550934 | 12/1968 | France | 439/557 |

*Primary Examiner*—Renee S. Luebke
*Attorney, Agent, or Firm*—Spencer & Frank

[57] ABSTRACT

A housing for electrical equipment, for insertion into an installation opening of a switching panel, includes a housing body which can be pushed through the installation opening in an insertion direction and a covering wall connected to the housing body which extends generally transversely to the insertion direction. The covering wall includes a collar which projects outwardly beyond the housing body in a direction which is transverse to the insertion direction, such that the collar limits insertion of the housing body into the opening. A plurality of lugs are connected to the housing body, and each of the lugs has a free end and is resiliently biased toward an initial position relative to the housing body. The housing body has a pair of side walls, and each of the pair of side walls supports an end of at least one corresponding one of the plurality of lugs at an acute angle thereto. Each free end extends to a location which is adjacent to the collar of the covering wall. Each of the lugs has a toothed detent surface in the vicinity of its free end for securing the housing body within the installation opening. Each of the plurality of lugs has a supporting bar which supports a supporting end, and the supporting bar extends from the free end inwardly toward a respective one of the pair of side walls. Each supporting end is resiliently engageable with an adjacent one of the pair of side walls when the housing body is in the installed position.

13 Claims, 3 Drawing Sheets

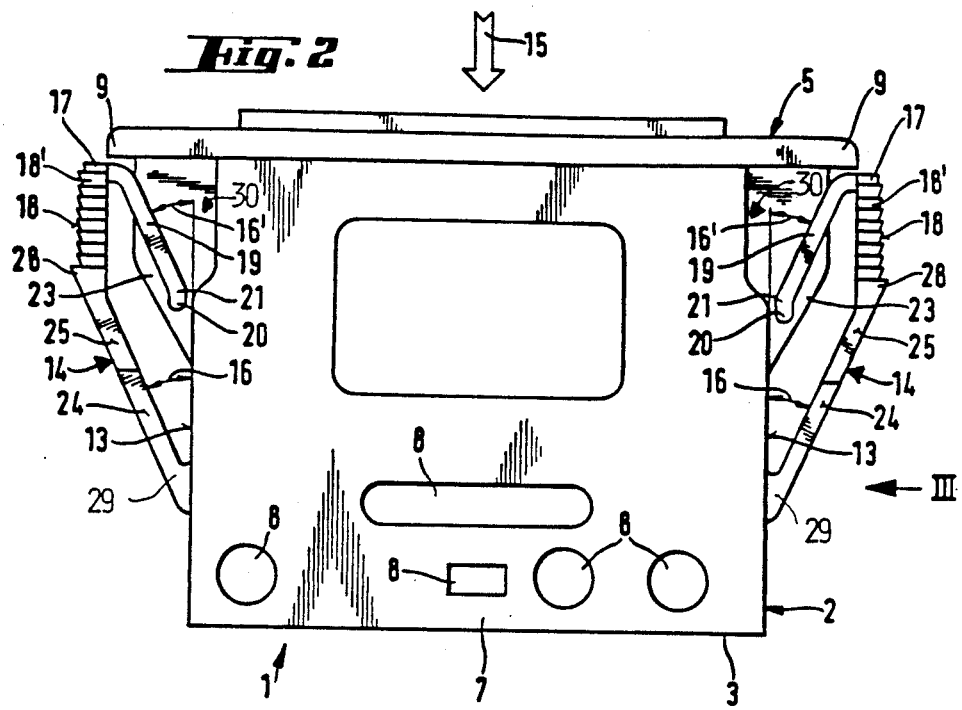
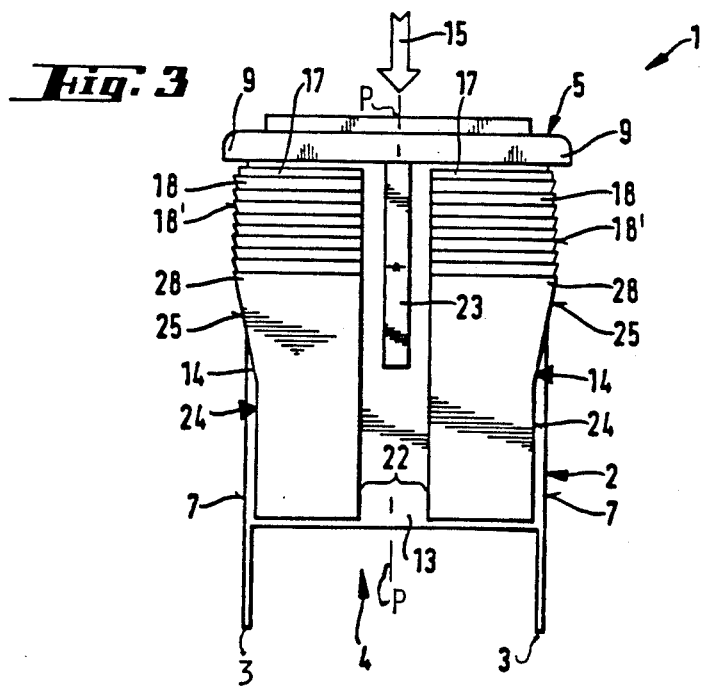

1

ELECTRICAL EQUIPMENT HOUSING

BACKGROUND OF THE INVENTION

The present invention relates to a housing for electrical equipment, particularly a switch having a housing body which can be pushed into an installation opening and a covering wall which extends across the installation opening, which is suitable for insertion into one of the installation openings of a switching panel.

Such housings are disclosed, for example, in F.R.G. Patent No. 2,928,277, which corresponds to U.S. Pat. No. 4,329,669 to Krasser et al. An essentially block-shaped housing body is inserted in an insertion direction from the front of a switching panel into an installation opening having a cross-sectional outline corresponding to that of the housing body. The housing includes a front cover wall connected to a housing body which extends transversely to the insertion direction and which has a collar which projects on all sides beyond the cross-sectional outline of the housing body so as to act as a limitation for the extent of insertion of the housing into the opening. In a final, installed position, the collar lies against a front surface region of the switching panel adjacent to the installation opening and covers it. The housing is fixed in the final installed position by means of resiliently deformable spreadable lugs which are attached to two opposed side walls of the housing body. The lugs project outwardly from the housing body at an acute angle which opens in a direction which is generally opposite to the insertion direction. The lugs have free ends which extend in a direction which is approximately parallel to the insertion direction and which have a toothed detent profile, each tooth of which can engage with a corresponding edge portion of the installation opening. Since the spreadable lugs are bent inwardly to be received in the installation opening when the housing body is pushed in, the inherent resiliency of the spreadable lugs creates an outwardly oriented spring force which secures the housing in the installation opening.

Problems arise with this prior art type of housing, since a firm seating of the housing in the installation opening is often not ensured over a wide range of switching panel thicknesses. For safety reasons, however, the attachment must be so strong that removal of the device from the switching panel is prevented regardless of the thickness of the switching panel, and wherein the housing can be removed only with the aid of special tools.

SUMMARY OF THE INVENTION

It is an object of the present invention to provide for reliable fastening of a housing in a installation opening of a switching panel and which is usable with a range of thicknesses of such switching panels.

This is accomplished by a switch housing according to the invention for insertion into an installation opening of a switching panel, including:

a housing body which can be pushed through the installation opening in an insertion direction;

a covering wall connected to the housing body and extending generally transversely to the insertion direction, the covering wall including a collar which projects outwardly beyond the housing body in a direction which is transverse to the insertion direction, such that the collar limits insertion of the housing body into the installation opening;

a plurality of lugs connected to the housing body; each of the lugs being resiliently biased toward an initial position relative to the housing body the housing body having a pair of side walls, each of the pair of side walls supporting an end of at least one corresponding one of the plurality of lugs at an acute angle thereto, the acute angle opening in a direction which is generally opposite to that o the insertion direction;

each of the plurality of lugs having a free end extends to a location which is adjacent to the collar of the covering wall;

each of the lugs having a toothed detent surface in the vicinity of the respective free end for securing the housing body within the installation opening; and each of the plurality of lugs having a supporting bar connected to the free end, each said supporting bar having a supporting end, and each supporting bar extending from the free end inwardly toward an adjacent one of the pair of side walls; each supporting end being resiliently engageable with an adjacent one of the pair of side walls when the housing body is in the installed position.

The supporting bars disposed at free ends of the spreadable lugs are each supported by an adjacent one of the side walls of the housing body, so that an additional outwardly directed force is exerted on the spreadable lugs so that the toothed detent profile engages with the corresponding side edges of the installation opening in an extremely reliable manner. Since this additional spring force is generated essentially independently of the plate thickness, the housing is secured in the installation opening over a wide range of switching panel thicknesses.

The supporting bars are each connected to the respective free ends of the spreadable lugs and are disposed at an acute angle thereto, the acute angle being open in the direction of insertion of the housing into the switching panel to ensure easy insertion of the housing into the installation opening. Additionally, in this arrangement the supporting bars are deflected during insertion of the housing into the opening in a direction which is generally transverse to the longitudinal extent of the lugs. In this direction, the supporting bars are resiliently deformable relative to the respective connected one of the lugs, and exhibit great elasticity and flexibility, and therefore the supporting bars have favorable spring characteristics.

An advantageous geometrical arrangement of the spreadable lugs relative to their supporting bars includes a generally parallel orientation therebetween, with the supporting bars being generally centrally disposed relative to the corresponding one of the spreadable lugs as seen in a direction which is transverse to the respective housing wall supporting the corresponding ones of the spreadable lugs. This configuration constitutes an optimum compromise between a high holding force and easy and springing engagement of the spreadable lugs with the switching panel at the installation opening and also results in relatively low material fatigue for the lugs and bars in the long run.

The supporting ends of the supporting bars extend in a direction which is generally parallel to the insertion direction so as to produce a slide surface extending in a direction which is approximately parallel to the corresponding ones of the supporting side walls, thereby reducing the sliding resistance of the supporting bars when their supporting ends slide along respective ones of the side walls during insertion of the housing into the installation opening. This sliding reduces correspondingly the forces that need to be exerted on the housing during exertion. Moreover, this slide surface prevents the supporting ends from catching on any possibly existing unevenness in the corresponding surfaces of the housing side walls or on any connected impediments during insertion of the housing into the installation opening.

The attachment of the housing per se is significantly improved by provision of a pair of spreadable lugs on each of the two opposite side walls, the lugs on each wall being separated by a central gap. On the one hand, doubling the number of spreadable lugs on each wall in itself produces a significant increase in the holding force of the spreadable lugs and, on the other hand, the separate spreadable lugs permit a highly advantageous compensation for deviations in dimensions and shape of the installation opening. The central gap additionally permits a displacement of the two spreadable lugs on each side toward each other within their major plane.

The fixing of the housing in the opening is further improved by provision of outwardly facing side surfaces on the lugs which project outwardly beyond the outline of each of the side walls supporting the lugs, each outwardly facing surface having an additional toothed detent profile. Since the side edges of the free ends of the spreadable lugs facing away from one another project beyond the corresponding portions of the outline of the housing body, it is possible to realize additional toothed engagement of the spreadable lugs with the material surrounding and defining the installation opening, and in particular with the longitudinal sides of the installation opening. The housing is thereby also secured against lateral displacement with the installation opening. The additional tooth engagement profile at the outwardly facing side edges of the spreadable lugs provides for additional toothed engagement of the spreadable lugs with the edges of the installation opening. Since the spreadable lugs in this case are bent inwardly toward one another—i.e. in a direction in which they are relatively very stiff—the stated configuration produces a very high additional holding force resulting in a drastic improvement in the securing strength of the housing in the installation opening.

In order to keep the forces required for insertion of the housing in the installation opening from becoming too high, the side edges of the spreadable lugs facing away from one another are provided with outwardly extending slide slopes. This permits a relatively large mechanical advantage during insertion, without affecting the forces required for removal of the housing.

A blocking tooth is provided on each of the lugs to prevent unauthorized, forced extraction of the housing from the installation opening. This is to make removal possible only by use of a special tool so that applicable contact protection rules can be enforced. Also, due to strong counterpressure from the bottom—for example as a result of forces originating from the attached cables—the housing can be lifted out of the installation opening only up to the blocking teeth. In this position, the voltage carrying parts are still securely covered in the same manner as before.

The invention will be described in greater detail below with reference to an embodiment that is illustrated in the drawings.

BRIEF DESCRIPTION OF THE DRAWINGS

FIG. 2 is a front elevational view of a longitudinal side of the housing of FIG. 1.

FIG. 3 is a side elevational view of the housing of FIG. 1 taken along the direction of arrow III in FIG. 2.

DETAILED DESCRIPTION OF THE PREFERRED EMBODIMENT

Figure 1:
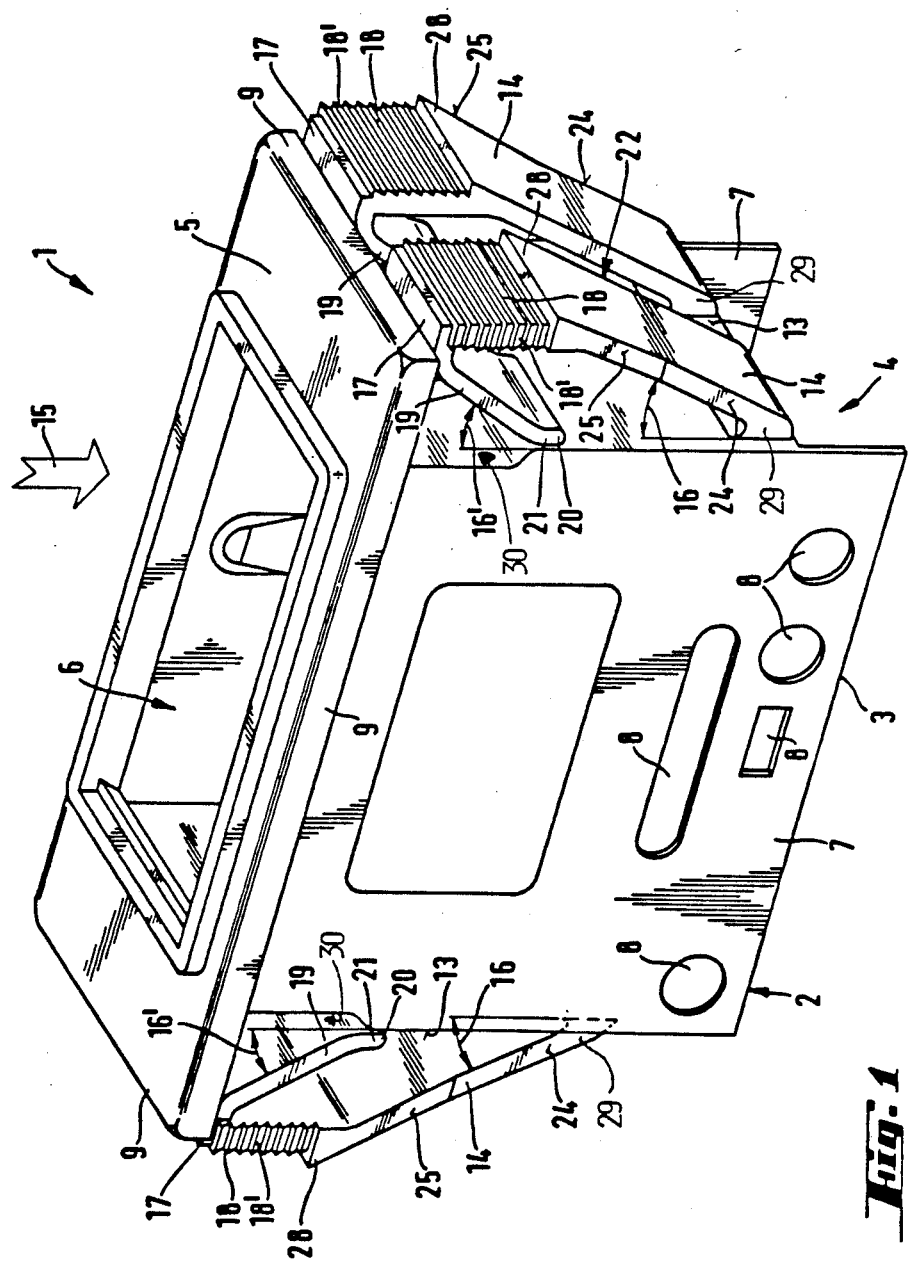
FIG. 1 is a perspective view of a housing according to the invention.

As shown in FIG. 1, a switch housing 1 composed of a single piece of an insulating material includes a generally block-shaped housing body 2. The housing 1 has a pair of opposed longitudinal side walls 7 disposed on either side of an opening 4, each of the side walls 7 having a bottommost edge 3. A switch unit (not shown) can be inserted through the opening 4 in the housing 1 and can be fastened within the housing 1. The housing 1 includes a covering wall 5 which is disposed on top of the housing body 2. The covering wall 5 has a rectangular opening 6. When the housing 1 is assembled with the switch unit (not shown), an operating element for the switch unit—for example a rocker switch—projects through the rectangular opening 6. Various openings 8 are provided in the longitudinal side walls 7 for engagement, for example, of detent elements at the exterior of the switch unit so as to secure it in the housing body 2.

Figure 4:
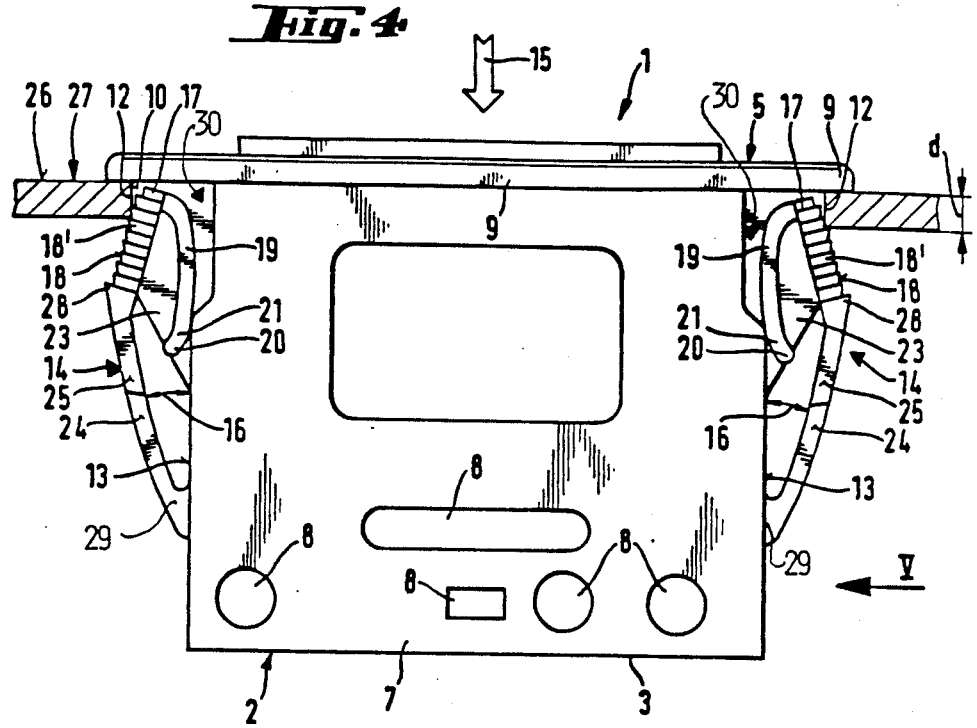
FIG. 4 is a front elevational view of the housing of FIG. 2 in an installed position.
Figure 5:
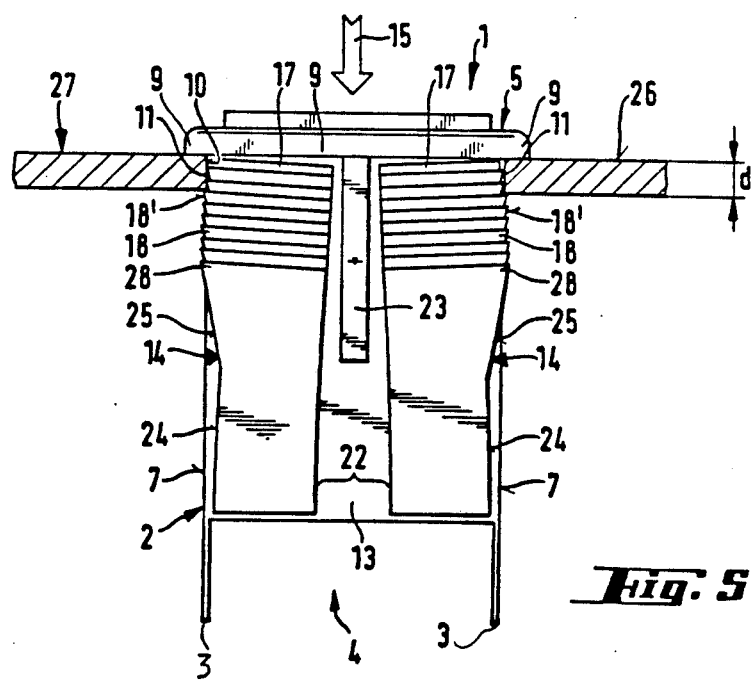
FIG. 5 is a side elevational view of the housing in the installed position taken along the direction of arrow V of FIG. 4.

As shown in FIGS. 4 and 5, the covering wall 5 is enlarged as compared to a rectangular installation opening 10 by means of a collar 9 which projects on all sides beyond the cross-sectional outline of the housing body 2 such that the collar 9 acts as an insertion limit on insertion of the housing into the opening. The collar 9 additionally serves an edge covering in the final installed position of the housing body 2 for frontal edge regions of longitudinal side surfaces 11 and of transverse side surfaces 12 of the installation opening 10.

A pair of spreadable lugs 14 are integrally formed with each one of a pair of narrow side walls 13 of the housing body 2, and are each connected thereto at a root portion 29 which is disposed in the vicinity of the bottom 3 of the switch housing 1. The spreadable lugs 14 are elastically resilient and project outwardly at an acute angle as indicated in FIG. 1 by a double-headed arrow 16, this angle being open in a direction opposite to an insertion direction indicated by an arrow 15 in FIGS. 1-5. The spreadable lugs 14 have a generally flat rectangular cross section over their entire length. If the switch housing 1 is not inserted, the free ends 17 of the spreadable lugs 14 extend in a direction which is generally parallel to the insertion direction indicated by the arrow 15, as shown in FIG. 2. In each case, each respective one of the free ends 17 of the spreadable lugs 14 terminate immediately before the collar 9 of the covering wall 5 and each of the free ends 17 has a toothed detent profile 18 on an exterior side thereof so as to fix the switch housing 1 to the transverse side surfaces 12 of the installation opening 10.

Each of the spreadable lugs 14 has a supporting bar 19 which extends inwardly toward a corresponding one of the narrow side walls 13. Each supporting bar 19 has a supporting end 20 extending therefrom. The portion of each of the narrow side walls which faces the supporting bars 19 is recessed, except adjacent the corresponding supporting ends 20, so that a midsection of each of the supporting bars 19 can, when the spreadable lugs 14 are under load, flex inwardly toward an adjacent one of the recessed portions 30. The free ends 17 of the spreadable lugs 14 terminate as shown in FIGS. 1–3 at a relatively small distance from the corresponding one of the narrow side walls 13. Each of the supporting bars 19 extends from the corresponding one of the narrow side walls 13 at an acute angle which opens in a direction which is opposite to the insertion direction 15 indicated by the arrow. Each of the supporting ends 20 has a short angled portion 21 which extends in a direction which is generally parallel to the insertion direction indicated by the arrow 15 and which serves as a slide face for the corresponding one of the supporting ends 20 of the corresponding supporting bars 19.

As can be seen in FIGS. 1, 3, and 5, a central gap 22 is disposed between the two spreadable lugs 14. An alignment web 23 is connected to each respective wall 13 and is disposed in a longitudinal center plane P—P (shown in FIG. 3) of the switch housing 1 through the central gap 22. Each web 23 is sufficiently thin so as to provide sufficient clearance to permit resilient deformation of the spreadable lugs 14 inwardly toward the corresponding alignment web 23 during insertion of the housing 1. The free ends 17 of the spreadable lugs 14 each have an outer side surface 24 which projects sidewardly beyond the housing body outline bounded by the dimensions of the narrow side wall 13. The free ends 17 are each provided with an additional toothed detent profile 18' which is disposed on each corresponding outer side surface 24 and which face outwardly, as shown in FIG. 3. The center region of each side surface 24 is configured so as to have a sloped surface portion 25. For this purpose, each of the side surfaces 24 extend outwardly from the base portion 29 beyond the outline of the housing body 2 at an acute angle thereto in direction which is generally opposite to the insertion direction indicated by the arrow 15.

FIGS. 4 and 5 show a final, installed position of the switch housing 1 in the installation opening 10 of a switching panel 27 having a thickness d. During installation, the bottom edges 3 of the housing body 2 are inserted first into the installation opening 10 from a front side 26 of the switching panel 27. The two spreadable lugs 14 are urged inwardly during installation of the switch housing 1 by the transverse side edges 12 of the installation opening 10 against their own outwardly directed spring force. The supporting bars 19 of the spreadable lugs 14 are each supported during insertion by the corresponding adjacent one of the narrow side walls 13 of the housing body 2 and generate an additional outwardly directed spring force normal to the side walls 13. During insertion, the housing body 2 is pushed into the installation opening 10 until the collar 9 of the covering wall 5 contacts the longitudinal side edge 11 and the transverse side edge 12 of the installation opening 10. One of the detent teeth of the respective toothed detent profile 18 snaps into place against a corresponding lower edge of the transverse side surface 12 of the installation opening 10, and one of the detent teeth of the respective toothed profile 18' snaps into place against a corresponding lower edge of the corresponding longitudinal side surface 11 (shown in FIG. 5), thereby fixing the switch housing 1 in the installation opening 10 with a relatively strong holding force. Since the supporting bars 19 additionally urge the spreadable lugs 14 outwardly from the corresponding one of the narrow side walls 13, the switch housing 1 is reliably held within the installation opening 10, independently of the thickness d of the switching panel 27. A typical thickness d can range from 1 to 6.3 mm, and this thickness range is encompassed by the switch housing 1 according to the invention. Thus, the spreadable lugs 14, when installed, are biased not only against the transverse side surfaces 12 but also against the longitudinal side surfaces 11, thereby securing the switch housing 1 against lateral displacement in the installation opening 10. This embodiment of the invention provides for play between the dimensions of the housing body 2 and the opening 10, the play being given by the respective differences between the width and length of the opening 10 and the corresponding width and length of the housing body 2, the length of the housing body 2 being determined as the distance between the two outermost edges of the two alignment bars 23. This play is compensated for by the resilient deformation of the spreadable lugs 14 in the longitudinal direction as well as in the transverse direction.

Each spreadable lug 14 has a blocking tooth 28 which is disposed at the end of the corresponding toothed detent profile 18 along the insertion direction 15. Each blocking tooth 28 extends transversely to the insertion direction indicated by the arrow 15 and projects outwardly further than any of the other teeth in the respective toothed detent profile 18. Therefore, in the event of a relatively large pulling force occurring at the switch housing 1 and acting thereon, or a pushing force from the bottom acting in a direction opposite to that of the insertion direction indicated by the arrow 15, the housing body 2 can be pushed out of the installation opening 10 only until the blocking teeth 28 come into engagement with corresponding ones of the transverse side surfaces 12. Any further movement of the housing body 2 is then possible only after the spreadable lugs 14 have been pushed inwardly, as by means of a tool.

It will be understood that the above description of the present invention is susceptible to various modifications, changes and adaptations, and the same are intended to be comprehended within the meaning and range of equivalents of the appended claims.

We claim:

1. A housing for electrical equipment, for insertion into an installation opening of a switching panel, comprising:
   a housing body which can be pushed through the installation opening in an insertion direction;
   a covering wall connected to said housing body and extending generally transversely to the insertion direction, said covering wall including a collar which projects outwardly beyond the housing body in a direction which is transverse to the insertion direction, such that said collar limits insertion of said housing body into the installation opening;
   a plurality of lugs connected to said housing body; each of said lugs being resiliently biased toward an initial position relative to said housing body;
   said housing body having a pair of side walls, each of said pair of side walls supporting an end of at least one corresponding one of said plurality of lugs at an acute angle thereto, said acute angle opening in a direction which is generally opposite to that of said insertion direction;

each of said plurality of lugs having a free end extending to a location which is adjacent to said collar of said covering wall;

each of said lugs having a toothed detent surface in the vicinity of the respective said free end for securing said housing body within the installation opening; and each of said plurality of lugs having a supporting bar connected to said free end, each said supporting bar having a supporting end, and each said supporting bar extending from said free end inwardly toward an adjacent one of said pair of side walls; each said supporting end being resiliently engageable with an adjacent one of said pair of side walls when said housing body is in the installed position; and wherein each of said supporting bars extend toward an adjacent one of said pair of side walls at an acute angle which opens in a direction which is generally opposite to the insertion direction.

2. A housing as defined in claim 1, wherein each said supporting end is disclosed generally centrally with respect to a length direction of a respective one of said plurality of lugs.

3. A housing as defined in claim 1, wherein each said supporting end includes an angled portion which extends in a direction which is generally parallel to the insertion direction.

4. A housing as defined in claim 1, wherein said housing body is generally block-shaped.

5. A housing as defined in claim 1, wherein each said free end is oriented in a direction which is generally parallel to s id insertion direction.

6. A housing as defined in claim 1, wherein said housing body is a unitary body.

7. A housing as defined in claim 1, wherein said covering wall covers frontal edge regions of the installation opening.

8. A housing as defined in claim 1, wherein each said free end extends to a location adjacent said collar of said covering wall.

9. A housing as defined in claim 1, wherein, in the installed position of said housing body, each said supporting end is supported by an adjacent one of said pair of side walls.

10. A housing as defined in claim 1, wherein each of said pair of side walls supports two of said plurality of lugs in spaced relationship including a central gap therebetween.

11. A housing as defined in claim 10, wherein each said free end has an outwardly facing side surface which extends beyond an adjacent one of said pair of side walls, and said outwardly facing side surface has an additional toothed detent profile.

12. A housing as defined in claim 11, wherein each of said plurality of lugs has a blocking tooth which extends generally transversely to the insertion direction and is disposed at an end of said toothed detent profile along the insertion direction; and wherein said blocking tooth projects outwardly beyond the respective said toothed detent profile.

13. A housing for electrical equipment, for insertion into an installation opening of a switching panel, comprising:

a housing body which can be pushed through the installation opening in an insertion direction;

a covering wall connected to said housing body and extending generally transversely to the insertion direction, said covering wall including a collar which projects outwardly beyond the housing body in a direction which is transverse to the insertion direction, such that said collar limits insertion of said housing body into the installation opening;

a plurality of lugs connected to said housing body; each of said lugs being resiliently biased toward an initial position relative to said housing body;

said housing body having a pair of side walls, each of said pair of side walls supporting an end of at least one corresponding one of said plurality of lugs at an acute angle thereto, said acute angle opening in a direction which is generally opposite to that of said insertion direction; and each of said pair of side walls supporting two of said plurality of lugs in spaced relationship including a central gap therebetween;

each of said plurality of lugs having a free end extending to a location which is adjacent to said collar of said covering wall;

each of said lugs having a toothed detent surface in the vicinity of the respective said free end for securing said housing body within the installation opening; each said free end having an outwardly facing side surface which extends beyond an adjacent one of said pair of side walls, and said outwardly facing side surface has an additional toothed detent profile; and each of said plurality of lugs having a supporting bar connected to said free end, each of said supporting bar having a supporting end, and each said supporting bar extending from said free end inwardly toward an adjacent one of said pair of side walls; each said supporting end being resiliently engageable with an adjacent one of said pair of side walls when said housing body is in the installed position; and wherein each said outwardly facing side surface includes a sloped portion which extends outwardly at an acute angle in a direction opposite to that of the insertion direction beyond an adjacent one of said pair of side walls.

* * * * *